(12) United States Patent
Stiller

(10) Patent No.: US 6,904,794 B2
(45) Date of Patent: Jun. 14, 2005

(54) METHOD FOR DETERMINING THE WHEEL LOADING OF A MOTOR VEHICLE

(75) Inventor: Alexander Stiller, Garbsen (DE)

(73) Assignee: Continental Aktiengesellschaft, Hannover (DE)

( * ) Notice: Subject to any disclaimer, the term of this patent is extended or adjusted under 35 U.S.C. 154(b) by 236 days.

(21) Appl. No.: 10/240,824

(22) PCT Filed: Mar. 10, 2001

(86) PCT No.: PCT/EP01/02692

§ 371 (c)(1),
(2), (4) Date: Oct. 7, 2002

(87) PCT Pub. No.: WO01/76897

PCT Pub. Date: Oct. 18, 2001

(65) Prior Publication Data

US 2003/0051554 A1 Mar. 20, 2003

(30) Foreign Application Priority Data

Apr. 7, 2000 (DE) .......................... 100 17 506

(51) Int. Cl.$^7$ ............................................ G01M 17/02
(52) U.S. Cl. ....................................................... 73/146
(58) Field of Search ................................ 73/146, 146.2, 73/146.3, 146.4, 146.5, 146.8

(56) References Cited

U.S. PATENT DOCUMENTS

| | | | | | |
|---|---|---|---|---|---|
| 4,783,089 A | * | 11/1988 | Hamilton et al. | ........ | 280/6.157 |
| 5,286,059 A | * | 2/1994 | Tabe | ........................ | 280/6.158 |
| 5,373,445 A | * | 12/1994 | Yopp | ............................ | 701/37 |
| 5,652,703 A | * | 7/1997 | Kawazoe | ..................... | 701/37 |
| 6,173,974 B1 | * | 1/2001 | Raad et al. | .............. | 280/6.157 |

* cited by examiner

Primary Examiner—Edward Lefkowitz
Assistant Examiner—Andre Allen
(74) Attorney, Agent, or Firm—Walter Ottesen

(57) ABSTRACT

The invention relates to a method for determining the wheel loading of a motor vehicle wheel, with an attached air spring, with the aid of which the vehicle chassis is suspended relative to the motor vehicle wheel, including the following steps: a stationary wheel loading is calculated from the product of the effective cross-sectional area of the air spring and the pressure therein; a dynamic wheel loading is calculated from the product of the spring stiffness of the air spring and the deflection from the rest position thereof; the wheel loading is determined by adding the stationary and dynamic wheel loadings.

10 Claims, 3 Drawing Sheets

METHOD FOR DETERMINING THE WHEEL LOADING OF A MOTOR VEHICLE

FIELD OF THE INVENTION

The invention relates to a method for determining the wheel loading or contact force of a wheel of a motor vehicle to which an air spring is assigned with which the vehicle body is suspended relative to the wheel of the motor vehicle.

BACKGROUND OF THE INVENTION

Modern motor vehicles often have at least one drive stability system, for example, an anti-locking system (ABS) or an electronically controlled stability program (ESP) which suppresses unwanted rotations of the motor vehicle about the vertical axis. Present day driving stability programs monitor the rotation of the wheels of the motor vehicle with sensors and derive therefrom the control quantities needed for a control operation, for example, the braking force at the individual wheels. The existing driving stability program could be improved if the wheel contact forces of the individual wheel were monitored in addition to the rpms. Accordingly, it is evident that, during a braking operation, a wheel, which has a lower wheel contact force, is to be subjected to less braking force than a wheel having a high contact force in order to suppress a blocking of the wheel in the same driving situation of the motor vehicle. Furthermore, additional important physical quantities of the motor vehicle can be computed from the wheel contact forces such as a weight force or mass and the axle load distributions. Up to now, no method has been known with which the wheel contact forces of the wheels of a motor vehicle can be exactly determined with little complexity.

SUMMARY OF THE INVENTION

The invention has as its basis to provide a method with which the wheel contact forces of the wheels of a motor vehicle can be determined in a simple manner.

The task is solved in accordance with the following method steps:

a stationary wheel contact force is computed from the product of the effective cross-sectional area of the air spring and the pressure in the air spring;

a dynamic contact force is computed from the product of the spring stiffness of the air spring and the deflection of the air spring from its rest position; and the steady-state wheel contact force and the dynamic wheel contact are added for determining the wheel contact force.

The computation of the steady-state wheel contact force takes place on the basis of the rest position of the vehicle body in the region of the motor vehicle wheel. The term rest position of the vehicle body in the region of the motor vehicle wheel is the position of the vehicle body which it assumes under steady state when only its own weight (inclusive of additional load) acts thereon.

The term steady-state wheel contact force is the wheel contact force which is generated at the wheel exclusively because of the vehicle mass resting in the vertical direction. The term dynamic wheel contact force is the wheel contact force which is generated at a wheel because of a vehicle body or the wheels, which vibrate in the vertical direction.

With the invention, the advantage is obtained that, in a motor vehicle, which has an air spring system, the wheel contact forces at the wheels, which have an air spring assigned thereto, can be easily computed. If each wheel of the motor vehicle is assigned an air spring, then the wheel contact forces of all wheels of the motor vehicle can be computed. To compute the wheel contact forces, the air spring system need not have components which are not present anyway in a conventional air spring system. For this reason, the costs of an air spring system in which the wheel contact forces are computed do not increase compared to a conventional air spring system.

A fixed value can be assumed for the effective cross-sectional area in the computation of the steady-state wheel contact force. This is especially possible when the effective cross-sectional area of the air spring changes only little or not at all in dependence upon its deflection as is the case, for example, in an air spring having a strictly cylindrical roll-off piston. A constant value for the spring stiffness can also be assumed in the computation of the dynamic wheel contact force. Preferably, however, the elevation dependency of the effective cross-sectional area is considered in the computation of the steady-state wheel contact force and, in the computation of the dynamic wheel contact force, the elevation dependency of the spring stiffness of the air spring is considered. The advantage of this improvement is that the steady-state wheel contact force as well as the dynamic wheel contact force and therefore the total wheel contact force can be computed exactly. The elevation-dependent effective cross-sectional area and the elevation-dependent spring stiffness of the air spring can be determined in a simple manner from a table or from a characteristic line.

According to a further embodiment of the invention:

the vehicle body is suspended with air springs relative to at least one vehicle axle which contains a roll stabilizer;

a compensating force is computed from the product of the spring stiffness of the roll stabilizer and the difference of the deflections of the air springs from their rest positions; and, the steady-state wheel contact force and the dynamic wheel contact force and, corrected for sign, the compensating force are added to determine the wheel contact force of a wheel of the vehicle axle.

The roll stabilizer counters an inclined position of the vehicle and attempts to press the vehicle back into the horizontal position. In this way, additional forces are generated at the wheels of the axle to which the roll stabilizer is assigned (called compensating forces in the claim). When the vehicle, for example, leans to the left, the roll stabilizer relieves the left side of the vehicle and adds load to the right side of the vehicle in order to press the vehicle into the horizontal position. Accordingly, in the computation of the wheel contact force for the motor vehicle wheel on the left side, a negative compensating force is to be added to the steady-state wheel contact force and to the dynamic wheel contact force and, for the wheel on the right side of the vehicle, a positive compensating force is to be added (for more detail, see the description of the figures). The advantage of the improvement is that in the computation of the total wheel contact force of a motor vehicle wheel, also the influences of a roll stabilizer are considered and therefore an exact computation of the wheel contact force is possible even for an inclined position of the motor vehicle (for example, in curve travel).

A further embodiment of the invention according is characterized in that a damper is assigned to the wheel of the motor vehicle and a damping force is computed from the product of the damping coefficient and the speed which the motor vehicle wheel has relative to the vehicle chassis; and, the damping force is added to the wheel contact force.

The advantage of this embodiment is that also the force, which is applied by a damper to the wheel, is considered in the computation of the wheel contact force of a motor vehicle wheel. In a damper having an adjustable damping coefficient, the currently adjusted damping coefficient is used for the computation of the damping force.

According to an embodiment of the invention, the rest position of the vehicle body in the region of each motor vehicle wheel and the steady-state wheel contact force of each motor vehicle wheel, to which an air spring is assigned, are determined at the air spring assigned to the wheel directly after switching on the ignition and directly after a control operation.

The advantage of this embodiment is that the motor vehicle is at rest with respect to its vertical movement directly after switching on the ignition. In this way, an exact determination of the steady-state wheel contact force is possible at this time point in a simple manner. The wheel contact forces, which are determined directly after switching on the ignition, are stored in the control unit of the air spring system so that they are later available there for the computation of the total wheel contact force. Preferably, a determination of the steady-state wheel contact force after switching on the ignition is made only below a pregiven speed limit value. A new computation of a steady-state wheel contact force and the rest position during travel of the motor vehicle is only necessary when a control operation has been undertaken at the air spring, which is assigned to this wheel, or a deviation from the rest position occurs because, in this case, the pressure and the position in this air spring, and therefore also the steady-state wheel contact force, can have changed at the corresponding wheel. If, during the travel, no control operation takes place at an air spring and no steady-state deviation from the rest position occurs, then the wheel contact force of the wheel assigned to this air spring is only computed anew when the ignition of the motor vehicle is switched on again after a switch-off. A further advantage of this embodiment is that a computation of the steady-state wheel contact forces and the steady-state rest position takes place as seldom as possible whereby the computation complexity is reduced.

According to an embodiment of the invention, a determination of the rest position of the vehicle body in the region of each motor vehicle wheel and a determination of the pressure in an air spring (with the help of which the steady-state wheel contact force is computed) is suppressed during a travel in a curve, an inclined position or a twisting of the motor vehicle. The advantage of this embodiment is that a determination of the pressure in an air spring is not undertaken when the result of the determination could be made incorrect because of the driving situation of the motor vehicle. A travel in a curve of the motor vehicle can, for example, be detected from the steering wheel rotational movement. An inclined position or a twisting of the motor vehicle can be detected based on the signals of the elevation sensors which are assigned to the air springs of the motor vehicle.

According to an embodiment of the invention:
  an air spring is assigned to each wheel of the motor vehicle;
  the steady-state wheel contact force is computed for each wheel; and,
  the weight force of the vehicle is determined from the sum of the steady-state contact forces.

One of the above embodiments is directed to a motor vehicle which has an air spring assigned to each wheel of the motor vehicle. The advantage of the embodiment is that in such motor vehicles, the weight force or the mass of the motor vehicle can be computed from the steady-state wheel contact forces in a simple manner. The computed weight force can, for example, be used as an input quantity for a drive stability program. Furthermore, it is possible to warn the driver of the vehicle when the permissible total weight of the motor vehicle is exceeded.

According to another embodiment of the invention:
  from the sum of the steady-state wheel contact forces of the wheels of at least one vehicle axle, the steady-state axle load is determined which belongs to this axle; and,
  for at least this vehicle axle, the steady-state axle load distribution is computed from the quotient of the steady-state axle load to the vehicle weight force.

The advantage of this embodiment is that exceeding the permissible axle load (which is different for the front and rear axles) can be quickly recognized and the driver, if required, can be given an indication. The front axle of a motor vehicle, as a rule, is not significantly loaded by additional packages and the axle load of the rear axle is separately determinable. For this reason, an overloading of the motor vehicle can be quickly and reliably detected with this embodiment.

According to an embodiment of the invention:
  from the sum of the wheel contact forces of the wheels of at least one vehicle axle, the dynamic axle load is determined which belongs to this axle; and,
  for at least this wheel axle, the dynamic axle load distribution is computed from the quotient of the dynamic axle load to the vehicle weight force.

The advantage of this embodiment is that the dynamic axle load distribution in the vehicle can be determined in a simple manner. The dynamic axle load distribution, which is so computed, can be used as an input quantity for a drive stability program.

BRIEF DESCRIPTION OF THE DRAWING

An embodiment and additional advantages of the invention are explained in connection with the following figures wherein.

DESCRIPTION OF THE PREFERRED EMBODIMENTS OF THE INVENTION

Figure 1:
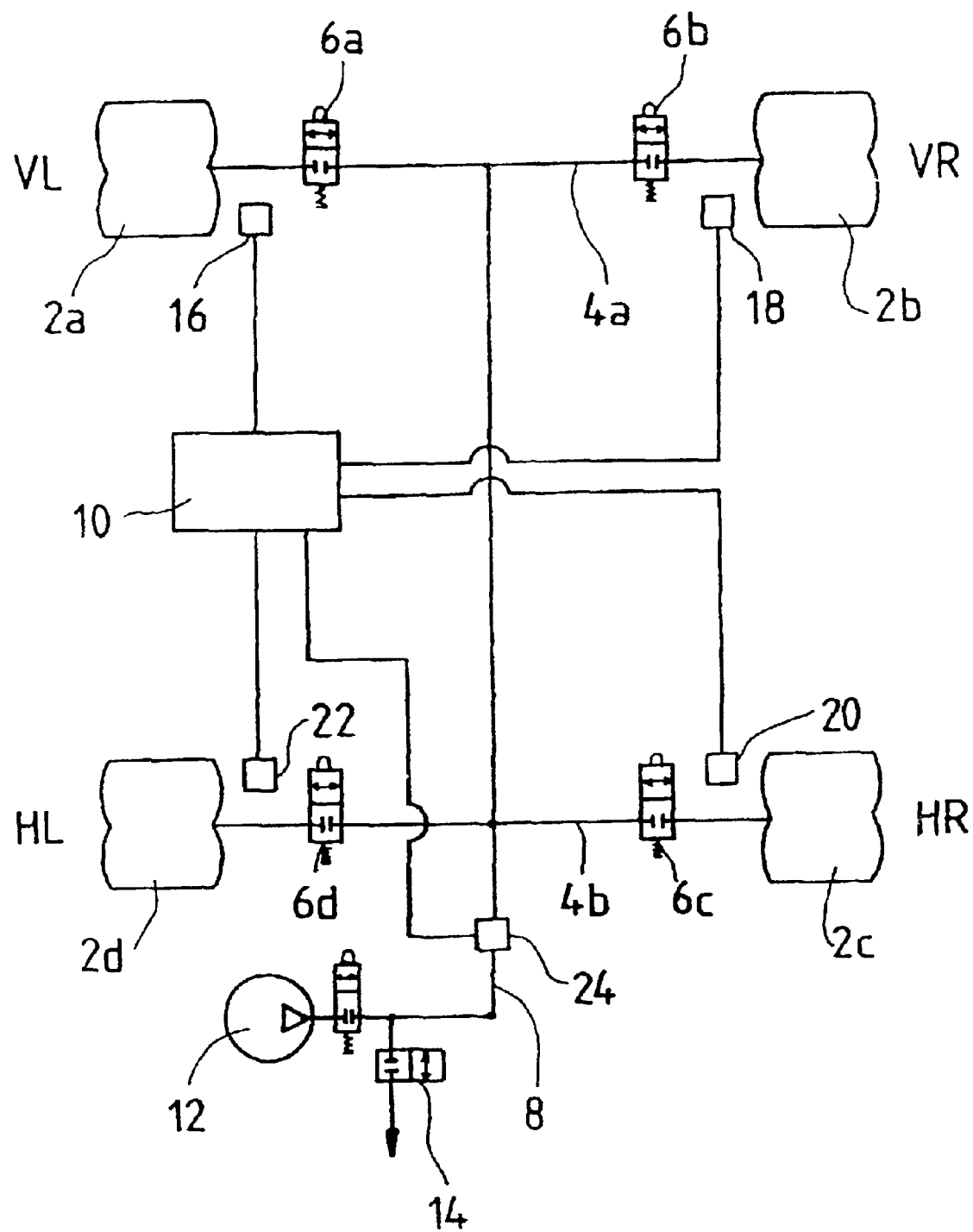
FIG. 1 shows an air spring system in schematic representation.

FIG. 1 shows schematically an air spring system for a motor vehicle wherein only the components are shown which are necessary for the following explanations. The air spring system includes air springs (2a, 2b) which are assigned to the front axle of the motor vehicle and air springs (2c, 2d) which are assigned to the rear axle of the motor vehicle. With the air springs 2a to 2d, a vehicle body (not shown) of the motor vehicle is suspended relative to the axles. The air springs (2a, 2b) are connected via a transverse line 4a and the air springs (2c, 2d) are connected to each other via a transverse line 4b. Each transverse line (4a, 4b) contains two transverse check valves (6a, 6b) and (6c, 6d) which are assigned to respective ones of the air springs 2a to 2d. Furthermore, the transverse lines (4a, 4b) are connected to a further line 8 via which the air springs 2a to 2d are filled with compressed air with the aid of compressor 12 or via which the compressed air is discharged to the atmosphere from the air springs 2a to 2d via the valve 14. For this purpose, the control inputs of the corresponding valves 6a to 6d, 14 and the compressor 12 are driven by the control unit 10.

In addition to the components described above, the air spring system includes a pressure sensor 24 in line 8 and elevation sensors 16, 18, 20 and 22 which are assigned to respective air springs 2a to 2d of the air spring system. The pressure in the air springs 2a to 2d can be measured with pressure sensor 24. The instantaneous elevation of the air springs 2a to 2d or the elevation of the vehicle body can be measured with the elevation sensors 16 to 22. It will later be explained how this occurs in detail.

With the aid of the air spring system shown in FIG. 1, the steady-state wheel contact force $FS_i$ on a motor vehicle wheel can be computed in accordance with the following formula:

$$FS_i = P_i \times A_i;\ i = 2a, 2b, 2c, 2d \quad (1)$$

wherein $P_i$ is the air pressure in the air spring i and $A_i$ is the effective cross section in the air spring i. For example, if the steady-state wheel contact force is to be computed for the vehicle wheel in the position "front left", the corresponding product for the air spring 2a is computed in Equation 1.

The computation of the steady-state wheel contact force of a motor vehicle wheel takes place on the basis of the rest position of the vehicle body in the region of the motor vehicle wheel, that is, in the determination of the steady-state wheel contact force, it is assumed that the vehicle body is at rest in the region of the vehicle wheel. It will later be explained how the rest position is determined.

The air pressure in each individual air spring 2a to 2d is measured preferably stepwise for each individual air spring one after the other for computing the steady-state wheel contact force. Based on the air spring 2a, it will now be explained how this takes place at standstill of the motor vehicle (at standstill of the motor vehicle, it is virtually assured that the vehicle chassis is actually at rest in the region of each wheel of the motor vehicle). First, the input of the transverse check valve 6a is supplied with current by the control unit 10 so that this valve passes from the base state shown in FIG. 1 into its switching state. The remaining valves 6b to 6d and the valve 14 remain in their base state shown in FIG. 1. The air spring 2a is then connected to the pressure sensor 24 via the transverse line 4a and the line 8. After a time of 0.2 to 1 second, the air pressure, which is present in the air spring 2a, has adjusted at the pressure sensor 24 and is thereafter continuously measured over a time span which lies preferably between 1 and 5 seconds. The pressure sensor 24 forms a mean value from the measurement values and transmits this to the control unit 10. In the control unit 10, the measured pressure mean value is assigned to the air spring 2a and stored (the control unit 10 "knows" that the transmitted pressure mean value belongs to the air spring 2a because it drove the transverse check valve 6a belonging to this air spring for making the pressure measurement). After the pressure measurement is made, the control input of the transverse check valve 6a is no longer supplied with current by the control unit 10 so that this check valve again assumes its base state.

The air pressure can be measured in the air springs 2b to 2d in the same way. The corresponding transverse check valve 6b to 6d is then driven by the control unit 10.

The air pressure can, as explained above, also be measured during the travel of the vehicle. The valve opening time of the corresponding transverse check valve is then only extended to a duration of approximately 2 to 10 seconds so that the corresponding pressure value in an air spring 2a to 2d is applied over a longer time span to the pressure sensor and, in this way, a mean value formation over a longer time span is possible. Pressure fluctuations, which occur during travel in the air springs 2a to 2d, are thereby filtered out with the mean value formation. These pressure fluctuations are caused by a fluctuation of the vehicle body about its rest position. Therefore, because of the mean value formation, the pressure in the air spring 2a to 2d can be measured also during travel of the vehicle with this pressure being present in the rest position of the vehicle body in the air spring even though the vehicle body is actually not at rest.

In the computation of the steady-state wheel contact force, a constant value can be utilized for the effective cross-sectional area of the air spring. This is especially then possible when the cross-sectional area is not dependent or only dependent to a small amount from the actual elevation of the air springs 2a to 2d. In most cases, the effective cross-sectional area of the air springs 2a to 2d is, however, a function of their current elevation. Preferably, this elevation is determined with the aid of the elevation sensors 16 to 22 and the effective cross-sectional area of the air springs 2a to 2d corresponding to the actual elevation is taken from a table or a characteristic line (see FIG. 3). In the determination of the steady-state wheel contact force, the rest position of the corresponding air spring 2a to 2d is controlling for the determination of the cross-sectional area; that is, the elevation of the air spring, which is assumed, when the vehicle body and the wheels of the vehicle are at rest in the vertical direction in the region of the air spring.

When, during the determination of the rest position of an air spring (this means the same as the rest position of the vehicle body in the region of the air spring), no change of the instantaneous elevation takes place as is mostly the case, for example, at standstill of the motor vehicle, then the rest position of the air springs 2a to 2d can be determined directly from the signal of the elevation sensors 16 to 22 and, in combination with the corresponding air springs 2a to 2d, be stored in the control unit. If the rest positions of the air springs 2a to 2d are to be determined when the instantaneous elevation position of the air springs 2a to 2d continuously changes, then the corresponding signal of the elevation sensors 16 to 22 are averaged over a longer time span in the control unit 10. The instantaneous elevation position of the air springs can change, for example, because of a vibration of the body of the vehicle or because of a vibration of the wheels. In this case, the fluctuations about the rest position of the air springs 2a to 2d are filtered out. The time span over which the averaging is done amounts, preferably, to 15 to 150 seconds.

The vehicle weight force FG of the motor vehicle can be computed as follows from the steady-state wheel forces $FS_i$, wherein i=2a to 2d:

$$FG = FS_{2a} + FS_{2b} + FS_{2c} + FS_{2d} \quad (2)$$

The steady-state axle loads ALVS and ALHS at the front axle and at the rear axle can be computed as follows:

$$ALVS = FS_{2a} + FS_{2b} \quad (3)$$

$$ALHS = FS_{2c} + FS_{2d} \quad (4)$$

The steady-state load distribution ALVT can be computed in accordance with the following formula:

$$ALVT = ALVS/FG \quad (5)$$

This value always lies between 0 and 1. If, for example, a value of 0.6 results, then this means that 60% of the total vehicle mass rests on the front axle and correspondingly, 40% rests on the rear axle.

The following are stored in the control unit 10 and are there available for further computations: the quantities for the rest position of the air springs 2a to 2d which are computed as explained above; the steady-state wheel contact forces; the axle loads and the vehicle weight force.

With the aid of the air spring system shown in FIG. 1, the dynamic wheel contact forces at the motor vehicle wheels can be computed with the following formula:

$$FD_i = k_i x (h_i(t) - h_{i,rest}); \ i=2a, 2b, 2c, 2d \qquad (6)$$

wherein, $FD_i$ is the dynamic wheel contact force at the wheel i, $k_i$ is the spring stiffness of the corresponding air spring i, $h_i(t)$ is the actual elevation position of the air spring i and $h_{i,rest}$ is the rest position of the air spring i. The difference within the parentheses in formula (6) therefore yields the deflection of the air spring i from its rest position. The instantaneous air spring position $h_i(t)$ is determined in that the instantaneous elevation position of the air spring i indicated by the corresponding elevation sensor 16 to 22 is considered for the air spring i at the time t by the control unit 10. The elevation $h_{i,rest}$ is so determined in the control unit 10 as has been already explained above. If a corresponding rest position is already stored in the control unit 10, then access can be made thereto and a new determination of the rest position of the air spring i is unnecessary.

A constant value can form the basis for the spring stiffness $k_i$ of the air spring i. This is especially possible when the spring stiffness is not dependent or is dependent only to a small extent on the actual elevation position of the air spring i. Preferably, however, the elevation dependency of the spring stiffness $k_i$ is considered. In this case, a table or a characteristic line (see FIG. 3) is stored in the control unit 10 from which the spring stiffness can be determined for the instantaneous elevation $h_i(t)$.

With the aid of the air spring system shown in FIG. 1, the influence of a roll stabilizer, which is present at the front axle, can be considered. The force, which is applied by a roll stabilizer to the front axle, is computed in accordance with the formula:

$$F_{stab,v} = k_v x ((h_{2b}(t) - h_{2b,rest}) - (h_{2a}(t) - h_{2a,rest})) \qquad (7)$$

wherein: $F_{stab}$ is the force of the roll stabilizer; $k_v$ is the spring stiffness of the roll stabilizer; $h_{2b}(t)$ is the instantaneous elevation position and, $h_{2b,rest}$ is the rest position of the air spring 2b; and, $h_{2a}(t)$ is the instantaneous elevation position and $h_{2a,rest}$ is the elevation position of the air spring 2a. The difference set forth between the parentheses in Formula (7) yields the transverse inclination of the vehicle at the front axle.

The force, which is generated by a roll stabilizer at the rear axle of the motor vehicle is computed correspondingly in accordance with the following formula:

$$F_{stab,H} = K_h x ((h_{2c}(t) - h_{2c,rest}) - (h_{2d}(t) - h_{2d,rest})) \qquad (8)$$

If one wants to consider the influence of the total stabilizers in the computation of the dynamic wheel contact forces, then this can be computed with the following formulas:

$$FD_{2a,total} = FD_{2a} + F_{stab,V} \qquad (9)$$

$$FD_{2b,total} = FD_{2b} - F_{stab,V} \qquad (10)$$

$$FD_{2c,total} = FD_{2c} - F_{stab,H} \qquad (11)$$

$$FD_{2d,total} = FD_{2d} + F_{stab,H} \qquad (12)$$

From the computed quantities, the total wheel contact force $F_{i,total}$ at the motor vehicle wheel i is as follows:

$$F_{i,total} = FS_i + FD_{i,total}; \ i=2a, 2b, 2c, 2d \qquad (13)$$

$F_{i,total}$ at the motor vehicle wheel i.

With the above mentioned quantities, the dynamic axle load at the front and rear axles can be computed in accordance with the following formulas:

$$ALVD_{axleload} = F_{2a,total} + F_{2b,total} \qquad (14)$$

$$ALDH_{axleload} = F_{2c,total} + F_{2d,total} \qquad (15)$$

In the following it is explained how, with the aid of the air spring system shown in FIG. 1, the influence of a damper (of which one is assigned to each of the air springs 2a to 2d) can be considered. The force applied by a damper is computed with the following formula:

$$F_{damp,i} = K_{damp,i} x v_i; \ i=2a, 2b, 2c, 2d \qquad (16)$$

wherein, $F_{damp,i}$ is the force of the damper at wheel i; $K_{damp,i}$ is the damping coefficient of the damper at wheel i; $v_i$ is the speed which the motor vehicle wheel i has relative to the vehicle body. The speed $v_i$ can be computed for each wheel i in accordance with the formula:

$$v_i = (H_i(t) - H_i(t - \delta t))/\delta t; \ i=2a, 2b, 2c, 2d \qquad (17)$$

wherein: $H_i(t)$ is the instantaneous elevation position of the air spring i at time point t; and, $H_i(t-\delta t)$ is the instantaneous elevation position of the air spring i at time point $t-\delta t$.

If, in the computation of the total wheel contact force, the forces, which are generated by the dampers, are to be considered, then the damping forces according to Equation (16) are added to the total wheel contact forces $F_{i,total}$ of Equation (13).

For the computation of the damping force, a constant value can form the basis for the damping coefficients $K_{damp,i}$. If, however, dampers with adjustable damping coefficients are used in the motor vehicle, then the instantaneous damping coefficient, which is adjusted by the control electronics of the damper, is preferably considered in the computation of the damping force.

The pressure values and elevation values, which are necessary for determining the above-mentioned wheel contact forces, are undertaken by means of pressure sensor 24 and by means of elevations sensors 16 to 22 only when the control unit 10 registers that the ignition of the vehicle is switched on and that the doors as well as the trunk are closed. In this case, the mass of the vehicle, which influences the wheel contact forces, does no longer change significantly. Furthermore, an activation of the pressure measurement by the control unit 10 only takes place when the elevation deviation at each air spring 2a to 2d lies in a tolerance range to a desired position pregiven to a corresponding air spring. After the control operation at an axle of the motor vehicle, the pressure in the air springs 2a to 2d, which are assigned to respective axles, is measured again by the control unit 10 because the pressure can have changed because of the control operation.

A pressure measurement is not carried out by the control unit 10 during a travel through a curve by the vehicle because the result could be made incorrect as a consequence of the influence of the roll stabilizers on the air springs 2a to 2d. Furthermore, a pressure measurement by the control unit 10 is not made during a level control operation so that this operation can be completed in the shortest time possible.

Figure 2:
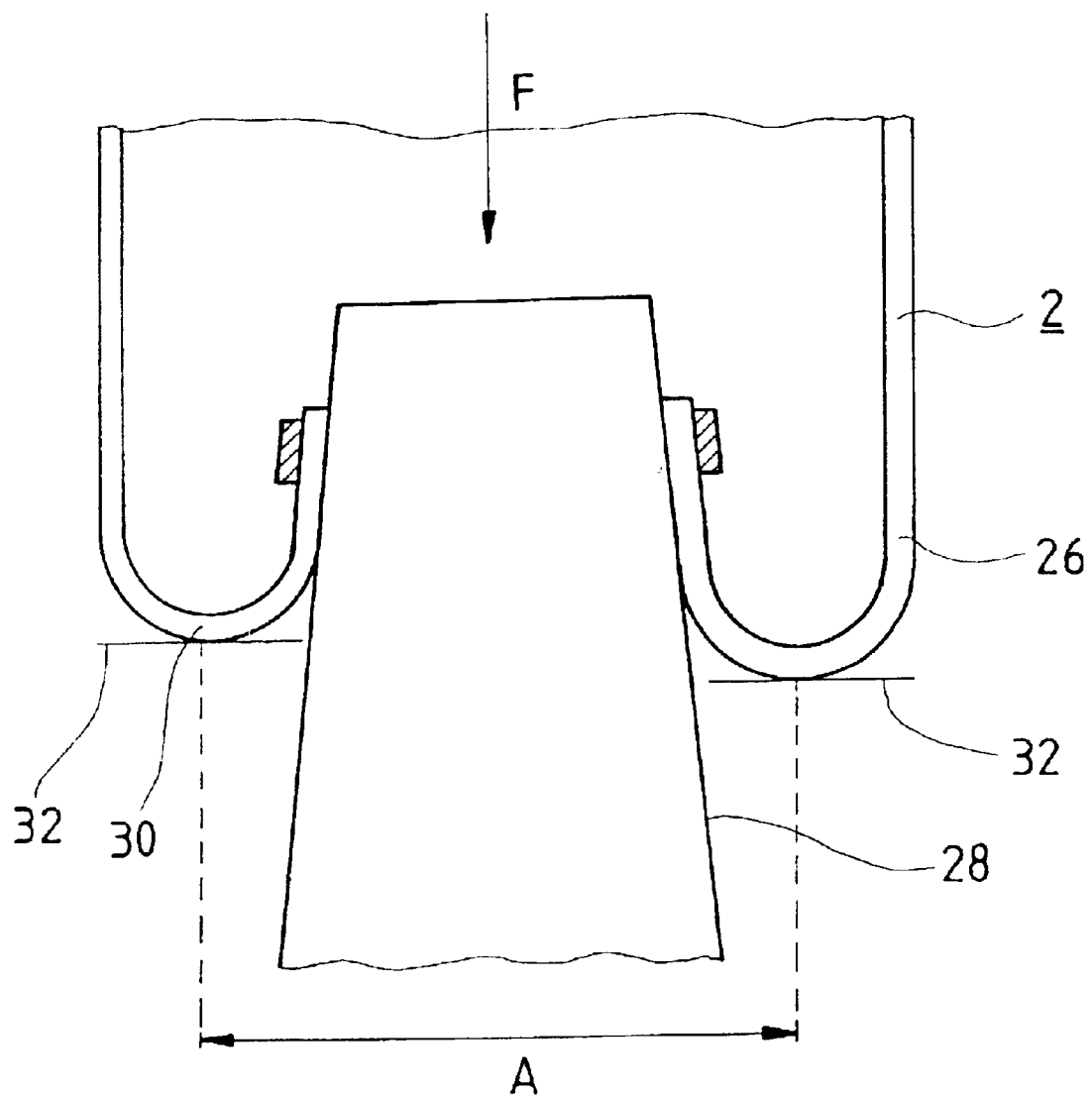
FIG. 2 shows an air spring in section.

FIG. 2 shows an air spring 2a to 2d in cross section. The resilient member 26 of the air spring 2a to 2d rolls on the roll-off piston 28. The outer limit circle of the effective cross-sectional area A lies at the location at which the tangents 32 on the resilient member 26 of the air springs run perpendicular to the spring force or support force F.

Figure 3:
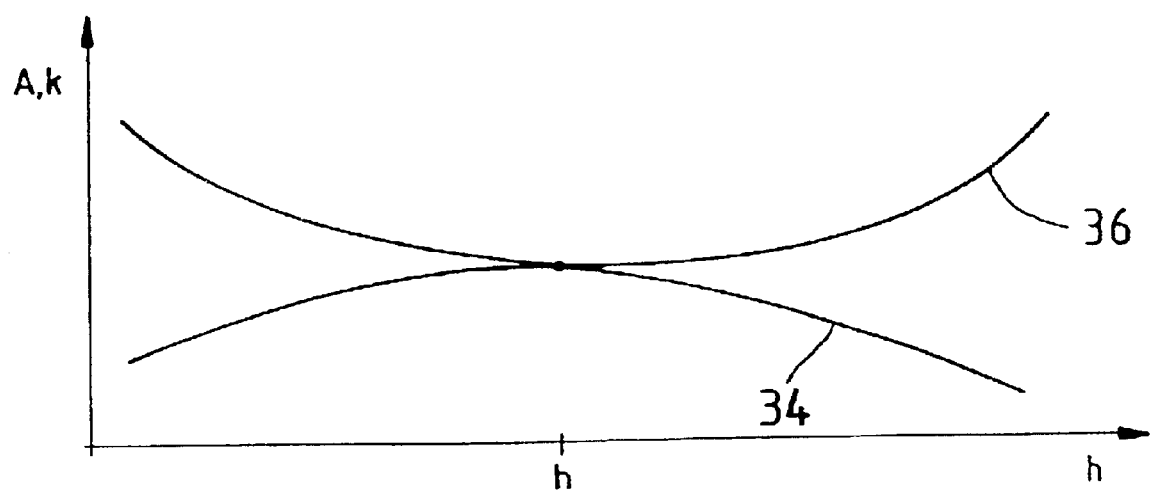
FIG. 3 shows a diagram.

FIG. 3 shows a diagram wherein the effective cross-sectional area A and the spring stiffness k of an air spring 2a to 2d is plotted as a function of elevation h. A characteristic line 34 is shown in the diagram and provides the dependency of the effective cross-sectional area A on the elevation h. Furthermore, a characteristic line 36 is shown which sets forth the dependency of the spring stiffness k of an air spring on the elevation. A corresponding diagram is stored in the control unit 10 for all air springs 2a to 2d which show a different dependency so that, for computing the wheel contact forces, the control unit can determine the instantaneous value for the cross-sectional area A and for the spring stiffness k with a knowledge of the instantaneous elevation position h of the air spring.

| Reference Numeral List | |
|---|---|
| 2a, 2b, 2c, 2d | Air Springs |
| 4a, 4b | Transverse Line |
| 6a, 6b, 6c, 6d | Transverse Check Valves |
| 8 | Line |
| 10 | Control Unit |
| 12 | Compressor |
| 14 | Discharge Valve |
| 16, 18, 20, 22 | Elevation Sensors |
| 24 | Pressure Sensor |
| 26 | Resilient Member |
| 28 | Roll-Off Piston |
| 30 | Rolling Lobe |
| 32 | Tangent |
| 34, 36 | Characteristic Line |

What is claimed is:

1. A method for determining the wheel contact force of a wheel of a motor vehicle and the motor vehicle including a vehicle body and air springs assigned to corresponding ones of the wheels of the vehicle for suspending said vehicle body relative to said wheels, the method comprising the steps of:
   computing and storing a steady-state wheel contact force from the product of the effective cross-sectional area of the air spring and the pressure in the air spring while considering the rest position of said vehicle body in the region of said wheel;
   computing a dynamic wheel contact force from the product of the spring stiffness of the air spring and the deflection of the air spring from said rest position; and,
   adding the steady-state wheel contact force and the dynamic wheel contact force to determine the wheel contact force.

2. The method of claim 1, comprising the further steps of:
   considering the elevation dependency of the effective cross-sectional area in the computation of the steady-state wheel contact force; and,
   considering the elevation dependency of the spring stiffness of the air spring in the computation of the dynamic wheel contact force.

3. The method of claim 1, wherein:
   the vehicle body is suspended relative to the vehicle axle with the air spring and the vehicle axle includes a roll stabilizer; the method comprising the further steps of:
   computing a compensating force from the product of the spring stiffness of the roll stabilizer and the difference of the deflection of the air spring from their rest position; and,
   adding the stationary wheel contact force and the dynamic wheel contact force and the compensating force corrected for sign to determine the wheel contact force of the wheel of the wheel axle.

4. The method of claim 1, comprising the further steps of:
   assigning a damper to the motor vehicle wheel and computing a damping force from the product of the damping coefficient and the speed which the motor vehicle wheel has relative to the vehicle body; and,
   adding the damping force to the wheel contact force.

5. The method of claim 4, wherein the instantaneously adjusted damping coefficient is used for computing the damping force in a damper having an adjustable damping coefficient.

6. The method of claim 1, wherein the rest position of the vehicle body in the region of each motor vehicle wheel and the steady-state wheel contact force of each motor vehicle wheel to which an air spring is assigned is determined directly after switching on the ignition and directly after a control operation at the air spring assigned to the wheel.

7. The method of claim 1, wherein the following are suppressed during travel in a curve, an incline position or a twisting of the motor vehicle: a determination of the rest position of the vehicle body in the region of a motor vehicle wheel and a determination of the pressure in an air spring with the aid of which the steady-state wheel contact force is computed.

8. The method of claim 1, comprising the steps of:
   assigning each wheel of the motor vehicle one of said air springs;
   computing a steady-state wheel contact force for each wheel; and,
   determining the weight force of the motor vehicle from the sum of the steady-state wheel contact forces.

9. The method of claim 1, wherein, from the sum of the steady-state wheel contact forces of the wheels of at least one vehicle axle, the steady-state axle load corresponding to that axle is determined; and, for at least this vehicle axle, the steady-state axle distribution is computed from the quotient of the steady-state axle load to the vehicle weight force.

10. The method of claim 1, wherein from the sum of the wheel contact forces of the wheels of at least one wheel axle, the dynamic axle load corresponding to that axle is determined; and, for at least this wheel axle, the dynamic axle load distribution is computed from the quotient of the dynamic axle load to the vehicle weight force.

* * * * *

UNITED STATES PATENT AND TRADEMARK OFFICE
CERTIFICATE OF CORRECTION

PATENT NO.     : 6,904,794 B2
DATED          : June 14, 2005
INVENTOR(S)    : Alexander Stiller It is certified that error appears in the above-identified patent and that said Letters Patent is hereby corrected as shown below:

Column 7,
Line 59, delete "total" and substitute -- roll -- therefor.

Signed and Sealed this

Sixteenth Day of August, 2005

JON W. DUDAS
*Director of the United States Patent and Trademark Office*